United States Patent
Lee et al.

(10) Patent No.: US 11,476,734 B1
(45) Date of Patent: Oct. 18, 2022

(54) SYSTEM, METHOD AND APPARATUS FOR DIRECT LIQUID-COOLED AXIAL FLUX ELECTRIC MACHINE WITH MULTIPLE PCB STATORS

(71) Applicant: INFINITUM ELECTRIC, INC., Round Rock, TX (US)

(72) Inventors: Randal A. Lee, Austin, TX (US); Paulo Guedes-Pinto, Round Rock, TX (US)

(73) Assignee: Infinitum Electric, Inc., Round Rock, TX (US)

( * ) Notice: Subject to any disclaimer, the term of this patent is extended or adjusted under 35 U.S.C. 154(b) by 0 days.

(21) Appl. No.: 17/716,577

(22) Filed: Apr. 8, 2022

(51) Int. Cl.
| | | |
|---|---|---|
| *H02K 9/19* | (2006.01) | |
| *H02K 5/20* | (2006.01) | |
| *H02K 1/2798* | (2022.01) | |
| *H02K 3/26* | (2006.01) | |
| *H02K 21/24* | (2006.01) | |
| *H02K 7/00* | (2006.01) | |

(52) U.S. Cl.
CPC ............ *H02K 5/203* (2021.01); *H02K 1/2798* (2022.01); *H02K 3/26* (2013.01); *H02K 7/003* (2013.01); *H02K 9/19* (2013.01); *H02K 21/24* (2013.01); *H02K 2203/03* (2013.01)

(58) Field of Classification Search
CPC ........ H02K 5/203; H02K 1/2798; H02K 3/26; H02K 7/003; H02K 9/19; H02K 21/24; H02K 2203/03
USPC .......................................................... 310/54
See application file for complete search history.

(56) References Cited

U.S. PATENT DOCUMENTS

| | | | |
|---|---|---|---|
| 6,304,011 B1 | 10/2001 | Pullen et al. | |
| 6,488,486 B1 | 12/2002 | Deblerser | |
| 2008/0100174 A1 | 5/2008 | Stahlhut et al. | |
| 2011/0234039 A1* | 9/2011 | Nishihama | ........... H02K 17/165 310/211 |

(Continued)

FOREIGN PATENT DOCUMENTS

| | | |
|---|---|---|
| CN | 111835153 A | 10/2020 |
| DE | 102015204721 A1 * | 9/2016 |
| JP | 2017099181 * | 6/2017 |

OTHER PUBLICATIONS

International Searching Authority, International Search Report and Written Opinion for PCT/US2022/024204 dated Jul. 1, 2022, 8 pages.

*Primary Examiner* — Terrance L Kenerly
(74) *Attorney, Agent, or Firm* — Dickinson Wright, PLLC; Michael E. Noe, Jr.

(57) ABSTRACT

A device has a housing and rotors rotatably coupled to the housing. Each rotor has a magnet on at least one side of the rotor. Printed circuit board (PCB) stators are located axially between the rotors and coupled to the housing. The PCB stators have layers, and each layer has coils. The number of rotors disks is equal to the number of stators plus one. The stators are interleaved with the rotors. A shaft is coupled to the rotors and the housing. The shaft has a hollow section coupled to a source of a liquid coolant through a rotary connector and to radial channels in the shaft that dispense a liquid coolant between the rotors and PCB stators. The shaft has flanges with different diameters configured to receive the rotors disks with respective matching bore diameters. In addition, the housing has a sump to collect the liquid coolant.

20 Claims, 12 Drawing Sheets

(56) References Cited

U.S. PATENT DOCUMENTS

2020/0274410 A1\* 8/2020 Yao ........................ H02K 21/24

\* cited by examiner

SYSTEM, METHOD AND APPARATUS FOR DIRECT LIQUID-COOLED AXIAL FLUX ELECTRIC MACHINE WITH MULTIPLE PCB STATORS

BACKGROUND OF THE DISCLOSURE

Field of the Disclosure

This disclosure relates in general to an axial field rotary energy device and, in particular, to a system, method and apparatus for a liquid-cooled axial flux electric machine, such as permanent magnet motors and generators having one or more printed circuit board (PCB) stators.

Background

Many high-power density electric machines (2.0 kW/kg and higher) can have a cylindrical rotor that is concentric to a cylindrical stator that carries conductive coils. The rotor can have conductive coils or magnets. The rotor rotates about its axis of rotation that is coincident with the axis of the stator. The air gap between the major surfaces of the rotor and stator can be narrow, such as 1 mm or less). Due to their high-power density, many of these machines are liquid-cooled. The cooling method can be direct or indirect. Indirect liquid cooling can be accomplished by having a cooling jacket carrying a liquid coolant mounted around the machine's stator, or by having cooling ducts embedded in the machine's stator as described in U.S. Pat. No. 8,201,316. Direct cooling can be achieved by spraying a coolant directly over the stator winding of the electric machine. Some of the direct cooling methods can use mineral or synthetic oil. When direct cooling is employed, the coolant is directed to the coil end turns, which is the portion of the coils that protrudes axially at both ends of the stator. It is undesirable to have the liquid coolant in the air gap because it will cause excessive drag losses in the narrow air gap.

Some axial field permanent magnet (PM) rotary devices, such as motors or generators, use printed circuit board (PCB) stator structures. Examples include U.S. Pat. Nos. 10,141,803, 10,135,310, 10,340,760, 10,141,804 and 10,186,922, each of which is incorporated herein by reference in its entirety. These devices can include one, two or more PCB stators, such as one PCB stator for each electrical phase of the device. Some devices may include a PCB stator having windings for more than one phase.

Each PCB stator can include a plurality of coils formed, for example, in a copper laminated structure of the PCB. As the device is powered, electrical currents circulate through the coils. The circulation of currents through the PCB stator coils produces resistive losses, and the interactions between those currents and external magnetic fields, and magnetic fields produced by the currents themselves, produce eddy current losses. The combination of the resistive and eddy currents losses generate heat in the PCB stator. This is an undesired effect of the circulation of currents in the PCB stator, as it increases the temperature of the stator. In extreme cases, the temperature rise of the PCB stator may exceed the temperature class of the laminate used in the PCB stator, leading to its premature failure. Thus, it is desirable to remove heat from the PCB stator to keep its temperature below the temperature class of the PCB laminate material.

The mechanisms for removing heat from the PCB stator can include conduction, convection, and radiation heat transfer. Some of the heat generated in the coil conductors can be carried by conduction to the external surfaces of the PCB stator where it can be removed by a coolant flow. Air is commonly used as a coolant, however due to its low density (approximately 1.2 kg/m$^3$), low thermal capacity (approximately 1.00 kJ/kg·K) and poor thermal conductivity (0.026 W/m·K), air is not the most effective coolant. In some high-power density applications where PCB stator losses can exceed 1,500 kW/m$^3$, for example, air cooling becomes less effective, limiting the power of the axial field PM rotary device. In those high-power density applications, coolants with higher thermal conductivity, thermal capacity and density can remove heat from the stator more effectively, allowing for higher power densities. For example, a liquid coolant (e.g., mineral oil) with a thermal conductivity of 0.15 W/m·K, thermal capacity of 1.67 kJ/kg·K and density of 800 kg/m$^3$ can remove heat from a PCB stator at a faster rate than air, enabling power densities 3 times or higher than what would be possible with air cooling, depending on coolant flow rates.

Some solutions to these problems have been proposed in the past, but they have significant shortcomings. For example, GB2485185 discloses a PCB stator in a hermetically sealed case that contains the coolant fluid. The hermetic case forms a complicated structure that is difficult to build. When the stator must be replaced, the hermetic case must be dismantled. Moreover, the hermetic case fundamentally interferes with the magnetic flux path between the rotor and stator, which significantly reduces its machine power and efficiency.

For those who are skilled in the art it will become apparent that the following disclosure greatly simplifies and enhances the direct cooling of axial field permanent magnet (PM) rotary devices.

SUMMARY

Embodiments of a system, method and apparatus for an axial field rotary energy device are disclosed. For example, the system can include a device with a housing and rotors rotatably coupled to the housing. Each rotor has a magnet on at least one side of the rotor. Printed circuit board (PCB) stators are located axially between the rotors and coupled to the housing. The PCB stators have layers, and each layer has coils. The number of rotors disks is equal to the number of stators plus one. The stators are interleaved with the rotors. A shaft is coupled to the rotors and the housing. The shaft has a hollow section coupled to a source of a liquid coolant through a rotary connector and to radial channels in the shaft that dispense a liquid coolant between the rotors and PCB stators. The shaft has flanges with different diameters configured to receive the rotors disks with respective matching bore diameters. In addition, the housing has a sump to collect the liquid coolant.

BRIEF DESCRIPTION OF THE DRAWINGS

So that the manner in which the features and advantages of the embodiments are attained and can be understood in more detail, a more particular description can be had by reference to the embodiments thereof that are illustrated in the appended drawings. However, the drawings illustrate only some embodiments and therefore are not to be considered limiting in scope as there can be other equally effective embodiments.

DETAILED DESCRIPTION

This disclosure includes embodiments of systems comprising an axial field PM rotary device. The device can include at least one stator, such as a PCB stator mounted in a housing along an axis. A rotor assembly can be rotatably mounted within the housing along the axis. The rotor assembly can have rotors on opposite axial ends of the PCB stator and can have features that provide for the distribution of a liquid coolant over the PCB stator surfaces. The housing can have features that can collect the liquid coolant and redirect it to a coolant circulation and cooling system that, in turn, returns the coolant back to the axial field PM rotary device.

Figure 1:
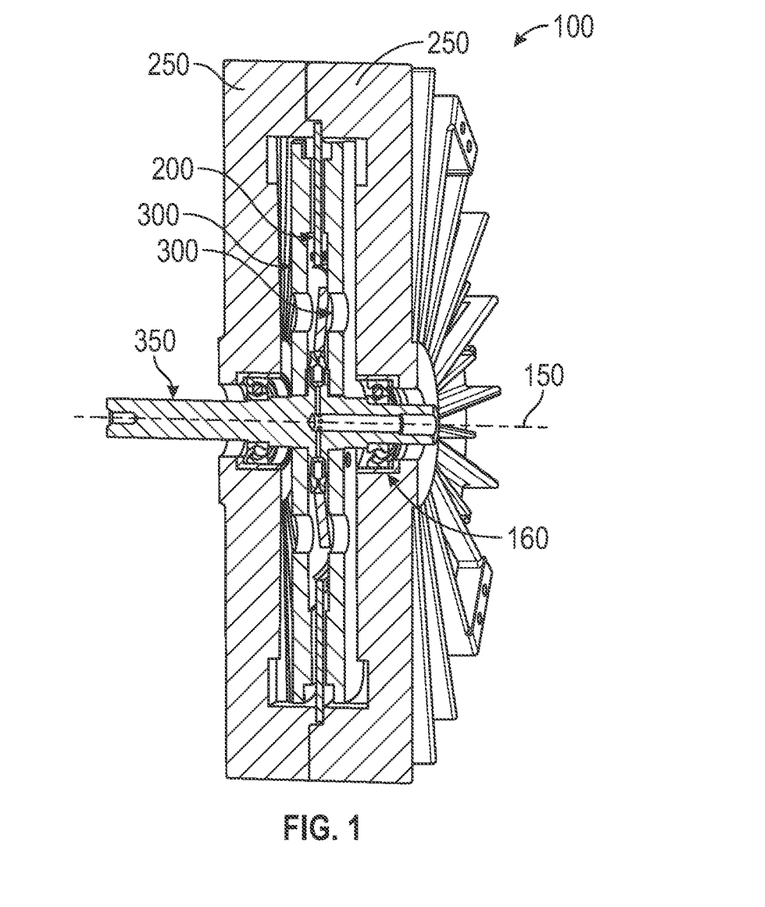
FIG. 1 is an isometric sectional view of an axial field PM rotary device with a PCB stator.

As shown in FIG. 1, an embodiment of an axial field PM rotary device 100, such as a motor or generator, can use a stator such as a PCB stator 200. The PCB stator 200 can be located between rotor disks 300 that are coupled to a shaft 350. The rotor disks 300 and shaft 350 can rotate about an axis of rotation 150 and include bearings 160 coupled to a housing 250. In FIG. 1, the housing 250 can include two housing components that are coupled together. The rotor discs 300 carry magnets that generate a magnetic field that interacts with electrical currents that flow through the PCB stator 200.

Figure 2:
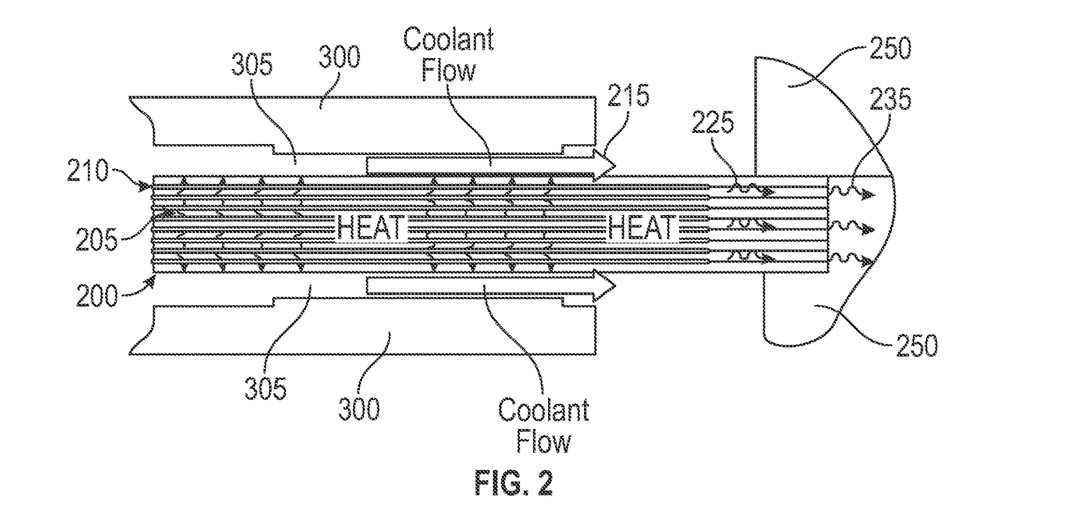
FIG. 2 is a schematic sectional side view of a portion of a PCB stator mounted to a machine housing, showing a heat flow scheme.

The axial field PM rotary device 100 can rely on conduction, convection, and radiation to remove heat from the PCB stator 200. FIG. 2 shows some of the heat removal mechanisms in and around the PCB stator 200, which has coils 210. Some of the heat generated in the conductors of the coils 210 is carried by conduction 205 to the external surfaces of the PCB stator 200. This heat can be removed by a coolant flow 215 that flows in the air gaps 305 between the stator 200 and the rotor discs 300. Other portions of the heat generated by the stator coils 210 can be carried by other conduction 225 along the layers of the PCB stator 200 toward the area where the PCB stator 200 is coupled to the housing 250. Heat 235 can continue to be conducted through the machine housing 250 towards cooler surfaces and volumes, as illustrated in FIG. 2.

Some axial field PM rotary devices with PCB stators may be designed to provide high power. In such cases, the resistive and eddy current losses associated with the currents circulating through the conductors in the PCB stator can be high and exceed the heat removal capability of air cooling. The excess heat in high power PCB stators can cause the stator to overheat and exceed the temperature class rating of its PCB laminate material. For high power applications, this disclosure replaces air as the stator cooling fluid with a liquid coolant. One example of a liquid coolant is mineral oil. Other coolants also can be used. For example, coolants that are not electrically conductive and not corrosive can be used to cool the PCB stator, such as mineral or synthetic transmission oil, transformer oil, silicone-based oil, and others. In some embodiments the coolant can be a mixture of water glycol, such as 60/40 water-MEG or 60/40 water-PEG (polyethylene glycol).

Figure 3:
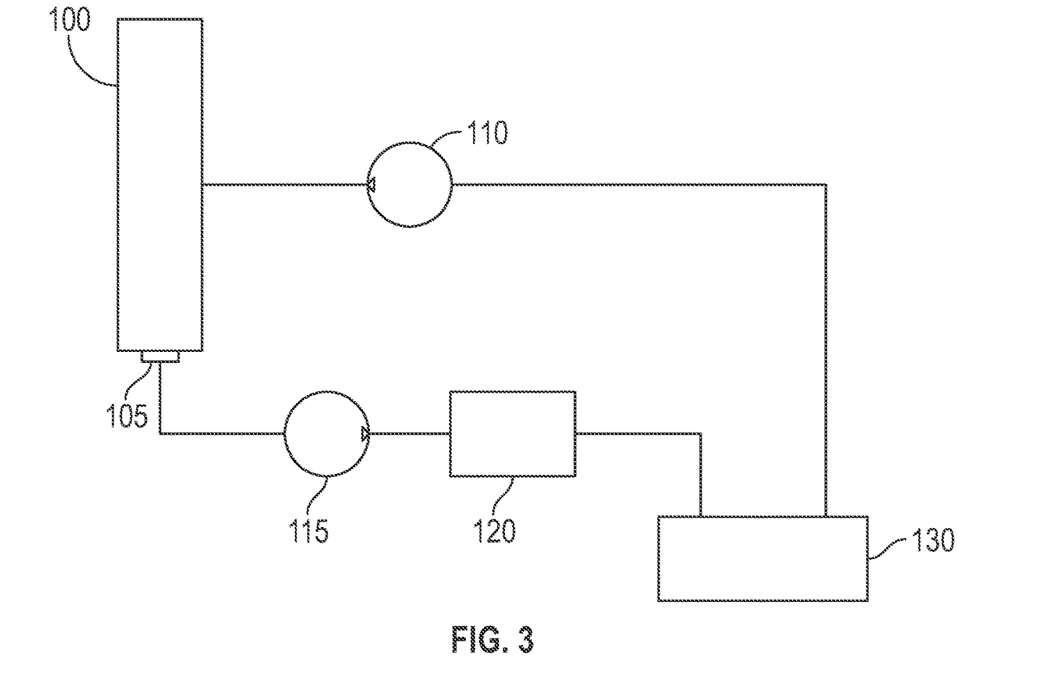
FIG. 3 is a schematic diagram of a system comprising an axial field PM rotary device and a liquid coolant circulation system with a separate heat exchanger for the liquid coolant.

FIG. 3 depicts an embodiment of a system where an axial field PM rotary device 100 is liquid cooled. The system can have a primary pump 110 that can provide a liquid coolant to the axial field PM rotary device 100. The liquid coolant can exit the axial field PM rotary device 100 through a drain 105 and be directed to a scavenge pump 115. From the scavenge pump 115, the liquid coolant can go through a separate heat exchanger 120 where the liquid is cooled to a lower temperature and returned to a reservoir 130. Examples of the separate heat exchanger 120 can include a liquid-to-air or a liquid-to-liquid heat exchanger. The primary pump 110, in turn, can recirculate the liquid coolant back to the axial field PM rotary device 100.

Figure 4:
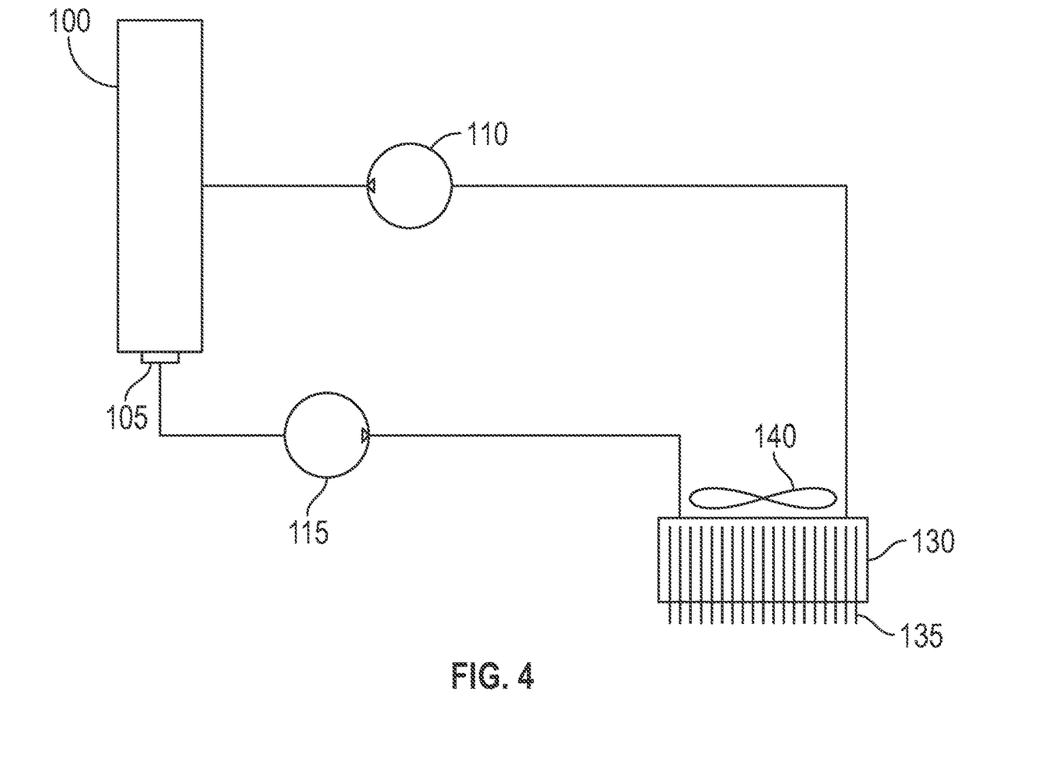
FIG. 4 is a schematic diagram of a system comprising an axial field PM rotary device and a liquid coolant circulation system with a coolant reservoir.

FIG. 4 shows an alternate embodiment of the system depicted in FIG. 3 where a primary pump 110 provides a liquid coolant to the axial field PM rotary device 100. The liquid coolant can exit the axial field PM rotary device through a drain 105 and be directed to a scavenge pump 115, which in turn, returns the liquid coolant directly to the reservoir 130. The reservoir 130 can have features to remove heat from the liquid coolant, such fins 135 and/or a cooling fan 140.

Figure 5:
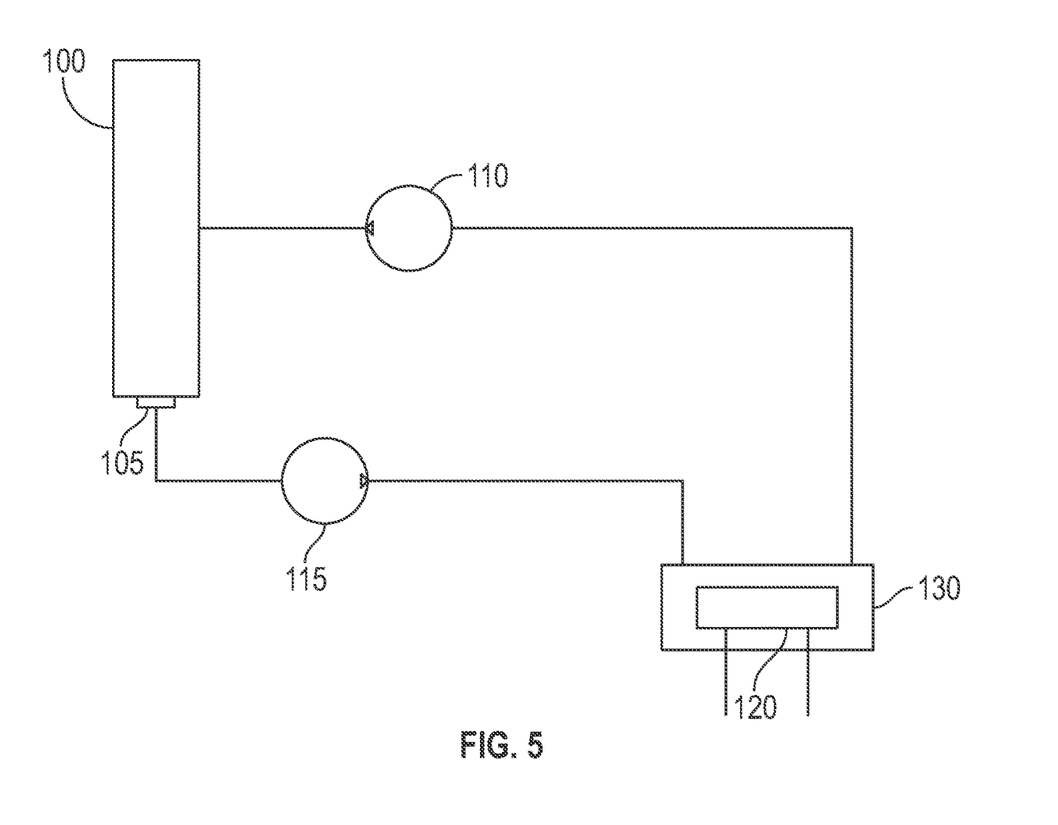
FIG. 5 is a schematic diagram of a system comprising an axial field PM rotary device and a liquid coolant circulation system with a reservoir coupled to a heat exchanger.

FIG. 5 shows yet another embodiment of the system depicted in FIG. 3. The primary pump 110 provides a liquid coolant to the axial field PM rotary device 100. The liquid coolant can exit the axial field PM rotary device 100 through a drain 105 and be directed to a scavenge pump 115, which in turn, returns the liquid coolant directly to the reservoir 130. The reservoir 130 can be coupled to a heat exchanger 120 that can remove heat from the liquid coolant. As an example, the heat exchanger 120 can be a liquid-to-liquid heat exchanger.

Other embodiments of the systems depicted in FIGS. 3 to 5 also can have sensors. The sensors can include flow meters, thermocouples, pressure gauges, and other sensors to monitor the liquid coolant flow, pressure, and temperature. Furthermore, still other embodiments can include valves to control the liquid coolant flow and pressure.

Figure 6:
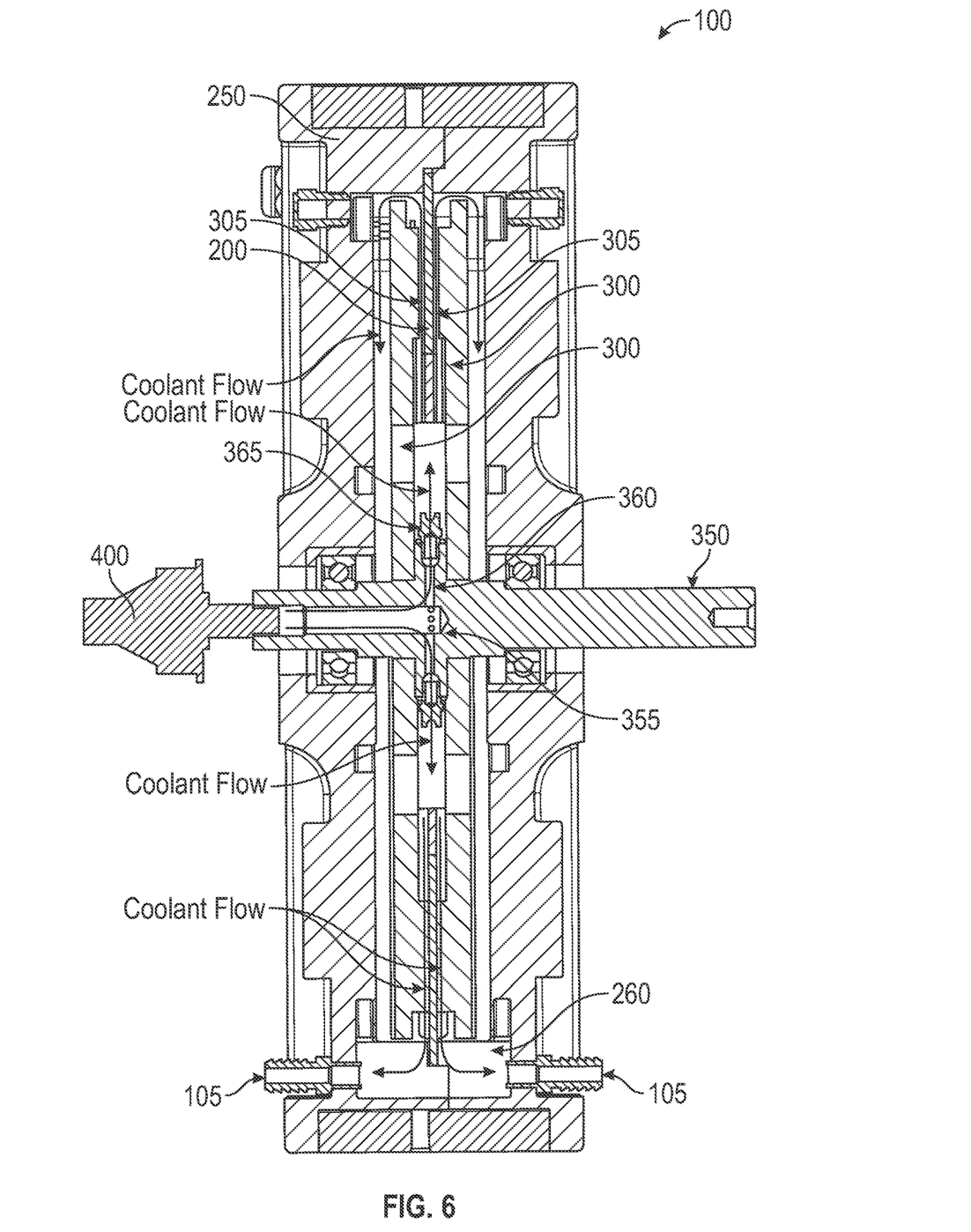
FIG. 6 is a sectional view of an axial field PM rotary device with PCB stator showing an embodiment of a liquid coolant circulation system.

FIG. 6 depicts an example of an axial field PM rotary device 100 with features that enable the liquid coolant circulation through the device. In the embodiment depicted in FIG. 6, the axial field PM rotary device 100 has a shaft 350 with a hollow section 355 that can be connected at the end of the shaft 350 to a rotary connector 400. Liquid coolant can be delivered to the axial field PM rotary device 100 via the rotary connector 400 and hollow section 355. The hollow section 355 can be coupled to one or more radial channels 360 that can direct and spread the liquid coolant radially between the static PCB stator 200 and the rotating rotor discs 300. Some embodiments can have nozzles 365 coupled to the radial channels 360 that can spread and/or direct the coolant and/or control the coolant flow. In an example, once the coolant enters the space between the rotor discs 300, it can flow radially through the air gaps 305 (i.e., one air gap 305 on each major side of the PCB stator 200) between the rotor discs 300 and the PCB stator 200 to remove heat from the PCB stator 200, as generally depicted in FIG. 2. The air gap 305 can have a width of 1.0 mm or more, for example, which allows for the liquid coolant to flow radially without creating excessive drag losses. The air gap 305 can be up to about 2.5 mm, in some examples. Other examples can include an air gap range of 1.1 mm (or 1.2 mm) to 2.5 mm, or 1.5 mm to 2.0 mm in still other examples. Alternative embodiments can include an air gap of up to 3.0 mm. Each of these versions can have negligible or insignificant drag losses from the liquid coolant. In prior art devices with narrower air gaps, however, excessive drag losses can be 2 or more times the mechanical losses of the device.

Referring again to FIG. 6, the liquid coolant can exit the air gaps 305 at the periphery of the rotor discs 300 then flow into the space between the rotor discs 300 and the interior walls of the housing 250 and collect at a sump 260. In some examples, the liquid coolant can exit the housing 250 through one or more drains 105. Although FIG. 6 shows two drains 105 on opposing sides of the housing, other embodiments can have only one drain or more than two drains and/or can have all drains on the same side of the housing. Furthermore, the drains 105 can be located at the bottom side of the housing 250.

Figure 7:
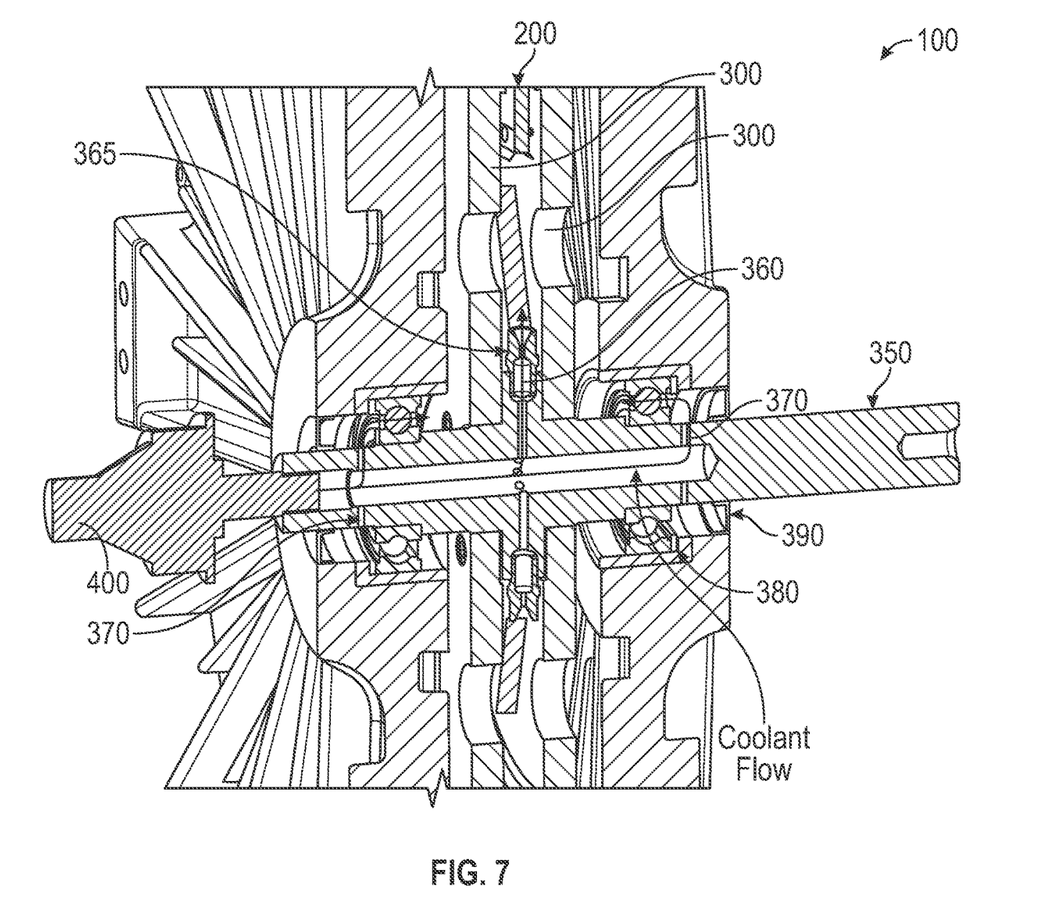
FIG. 7 is an isometric sectional view of an axial field PM rotary device with PCB stator showing an embodiment of a bearing lubrication and cooling system.

In the embodiment of FIG. 7, the liquid coolant can be an oil which can have the dual function of cooling the PCB stator 200 and lubricating and cooling the bearings 380 of the axial field PM rotary device 100. In some examples, the shaft 350 can include a hollow section 355 that extends from one end of the shaft 350 to the area under both bearings 380 and the rotor discs 300. As described for the example of FIG. 6, the oil can enter the hollow section 355 through the rotary connector 400. In addition to the radial channels 360 that distribute and dispense the cooling oil to the space between the rotor discs 300, this embodiment can have radial channels 370 that distribute and dispense oil to lubricate the bearings 380. The oil can flow through the bearings 380 and into the housing where it can mix with the oil flow cooling the stator PCB 200. The embodiment shown in FIG. 7 can have mechanical seals 390 that can retain and prevent the oil from leaking along the shaft 350.

Figure 8:
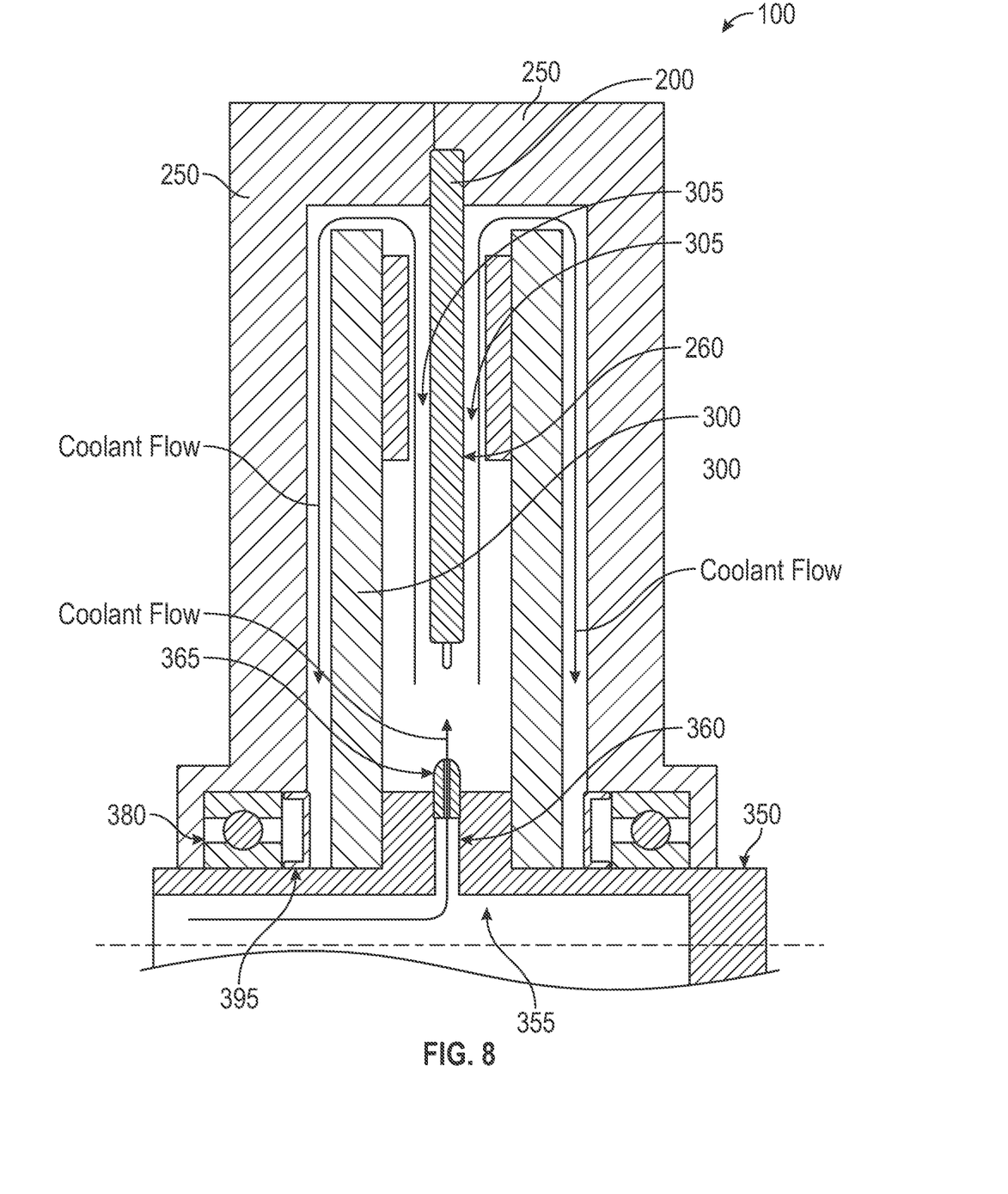
FIG. 8 is sectional view of an axial field PM rotary device showing an embodiment of a liquid coolant system where the stator is clad in a protective envelope.

Some embodiments of the axial field PM rotary device 100 can use a water-based coolant or some other coolant that can be corrosive. FIG. 8 shows an example of such an embodiment. In this version, liquid coolant enters the device through the hollow section 355 of the shaft 350 and flows radially through the radial channels 360 and nozzles 365 into the space between the rotor discs 300. The liquid coolant continues to flow radially through the air gaps 305 between the rotor discs 300 and PCB stator 200. In some examples, the PCB stator 200 can have a cladding 260 that prevents the liquid coolant from directly contacting the PCB stator 200. Embodiments of the cladding 260 can completely envelop and seal the PCB stator 200 from exposure to the liquid coolant. The cladding 260 can be formed from, for example, a thin sheet of a non-magnetic, corrosion-resistant material, such as Inconel 625, poly ether ether ketone (PEEK), acrylic-based conformal coating, Parylene conformal coating, or still other materials.

The liquid coolant can exit the air gaps 305 at the outer periphery of the rotor discs 300 then flow in the space between the rotor discs 300 and the interior walls of the housing 250. The liquid coolant can be collected and/or recycled as described elsewhere in this disclosure. Embodiments can have internal seals 395 to prevent the liquid coolant from contacting the bearings 380.

Figure 9:
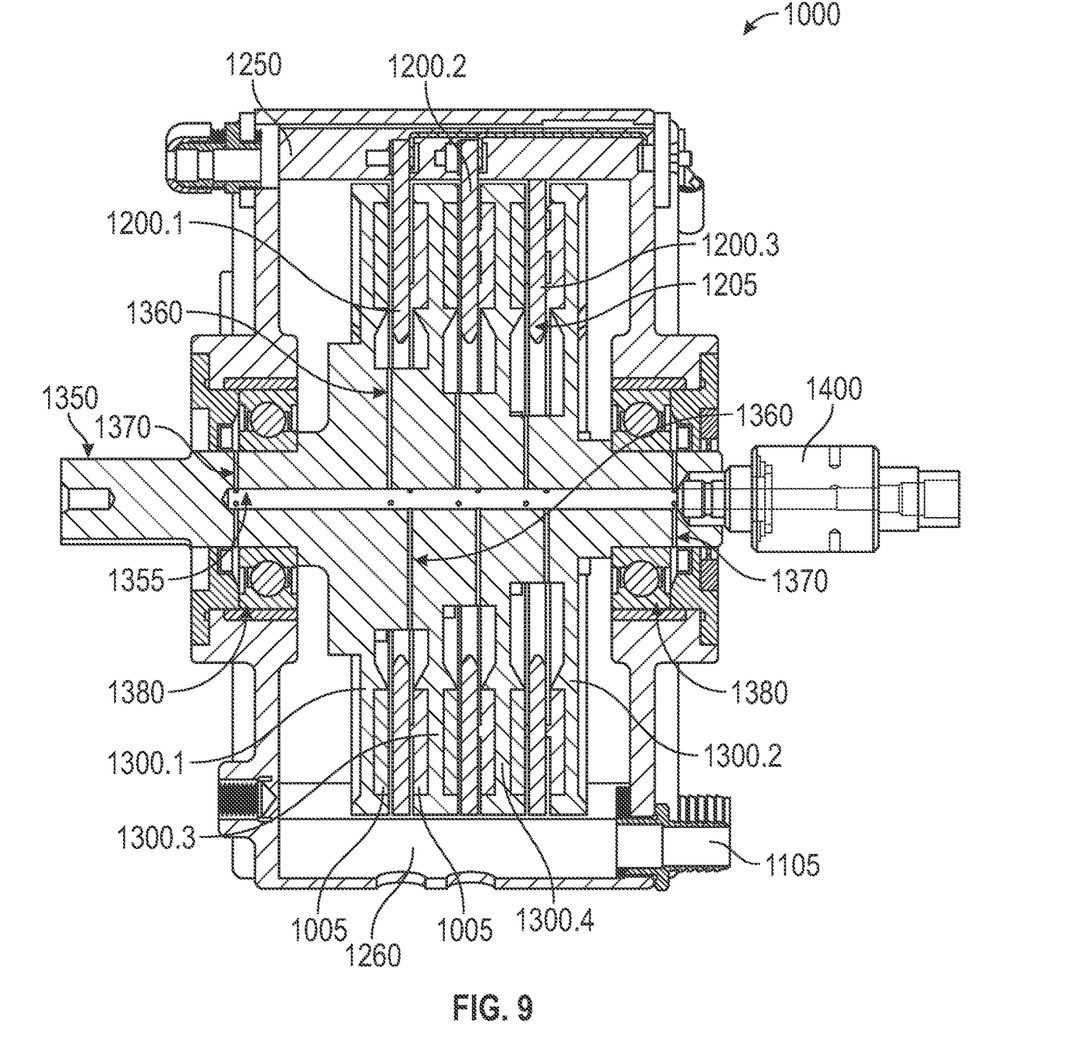
FIG. 9 is a sectional side view of another embodiments of the device.

Some embodiments of the axial field PM rotary device can have more than one PCB stator, as depicted in FIG. 9, which shows an example of a device 1000 with three PCB stators and four rotors. The axial field PM rotary device comprises three PCB stators 1200.1, 1200.2 and 1200.3 which can have layers and coils assigned to one or more electrical phases. PCB stators 1200.1, 1200.2 and 1200.3 can be coupled to a housing 1250 which can have bearings 1380 that support a rotating shaft 1350. The rotating shaft 1350 can support four rotor discs, in this example. Collectively, shaft 1350 and rotors disks 1300.1-1300.4 constitute a rotor. Discs 1300.1 and 1300.2 are mounted outboard of PCB stators 1200.1 and 1200.3, respectively, and carry magnets 1005 on the side facing a stator. Discs 1300.3 and 1300.4 are mounted between PCB stators 1200.1 and 1200.2, and 1200.2 and 1200.3 respectively and carry magnets 1005 on both sides of each disc. The example shown in FIG. 9 has each PCB stator assigned to one electrical phase, however other embodiments can have 3-phase PCB stators, or other stator-phase arrangements.

The shaft 1350 can have a cavity 1355 coupled to a rotary connector 1400 that supplies a liquid coolant to the axial field PM rotary device 1000. The rotary connector 1400 can be capable of operating at high rotational speeds (e.g., between 7,500 and 10,000 rpm, for example). The cavity 1355 is coupled to a plurality of radial channels 1360 that can direct and spread the liquid coolant radially between the static PCB stators 1200.1, 1200.2 and 1200.3 and the rotating rotor discs 1300.1 through 1300.4. The liquid coolant can flow radially through the gaps between the rotors and stators, then flow around the internal walls of housing 1250, collect at a sump 1260, and exit the housing 1250 through one or more drains 1105. In addition to the radial channels 1360, the shaft 1350 can have radial channels 1370 located outboard of bearings 1380. Channels 1370 can provide a coolant flow through bearings 1380 which can help cool and lubricate the bearings (similarly to the embodiment depicted in FIG. 7). Some embodiments may not have channels 1370 providing coolant flow to the bearings 1380.

Although FIG. 9 shows an axial field PM rotary device with three stators and four rotors, other embodiments of device 1000 can have two stators and three rotors, or more generally, N stators and M rotors where M=N+1.

Figure 10A:
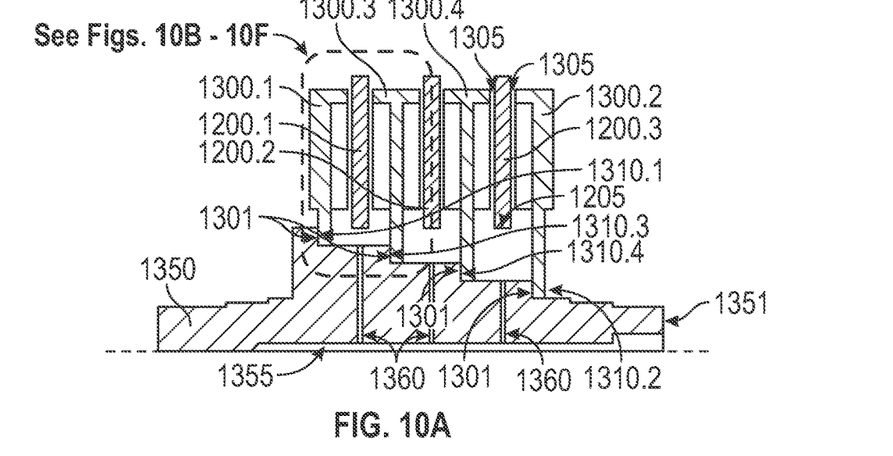
FIGS. 10A-10F are partial sectional side views of other embodiments of the device.

FIG. 10A shows a schematic view of device 1000 where the housing 1250 has been removed for clarity. In FIG. 10A, the shaft 1350 of the device 1000 comprises flanges 1310.1 through 1310.4 that have different diameters. In the example shown in FIG. 10A, flange 1310.1 has a larger diameter than all other flanges and is coupled to rotor disk 1300.1. Flange 1310.3 is coupled to rotor disk 1310.3 and has a smaller diameter than flange 1310.1, but larger than flange 1310.4. Flange 1310.4 is coupled to rotor disk 1300.4 and has a diameter smaller than flange 1310.3, but larger than flange 1310.2. Finally, flange 1310.2 has a diameter smaller than all other flanges and is coupled to rotor disk 1300.2. The embodiment depicted in FIG. 10A, allows for the sequential assembly of rotor disk 1300.1, PCB stator 1200.1, rotor 1300.3, PCB stator 1200.2, rotor 1300.4, PCB stator 1200.3 and rotor 1300.2 from the same end 1351 of the shaft 1350, which can enable an automated assembly process.

Some embodiments of device 1000 can have between the rotor disks 1300.1-1300.4 and the corresponding shaft flanges 1310.1-1310.4, shims 1301 with different thicknesses that can be added or removed to adjust the axial position of the rotor disks relative to PCB stators and therefore to adjust air gaps 1305 (FIG. 10A).

Figure 10B:
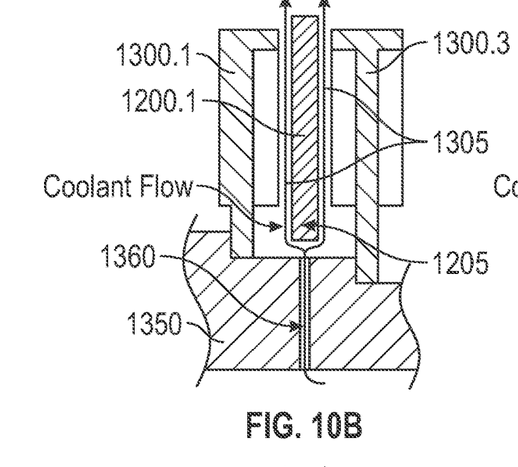

FIG. 10B shows a detail of the embodiment shown FIG. 10A, where the radial channels 1360 are substantially aligned axially with the PCB stators 1200.1 through 1200.3. In this embodiment the coolant flow that emerges from the radial channel 1360 can split in two streams that flow radially in the air gaps 1305 between PCB stator 1200.1 and rotors 1300.1 and 1300.3, for example. In the embodiment shown in FIGS. 10A and 10B, the PCB stator inner edge 1205 has a flat edge substantially perpendicular to the faces of the PCB stator 1200.1.

Figure 10C:
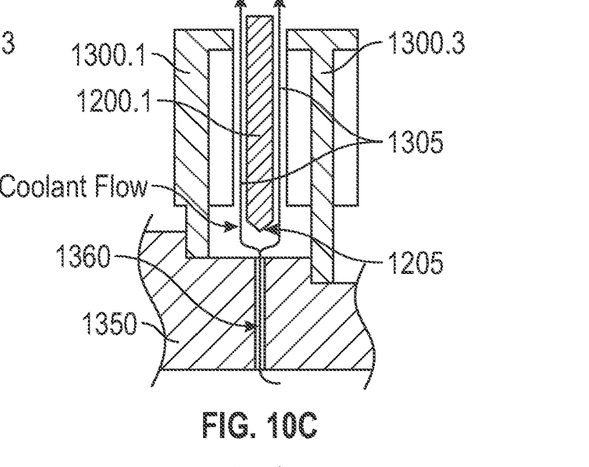

FIG. 10C shows another embodiment where the PCB stator inner edge 1205 has a substantially wedge shape that can further help split the coolant flow in two streams and direct them towards the air gaps 1305.

Figure 10D:
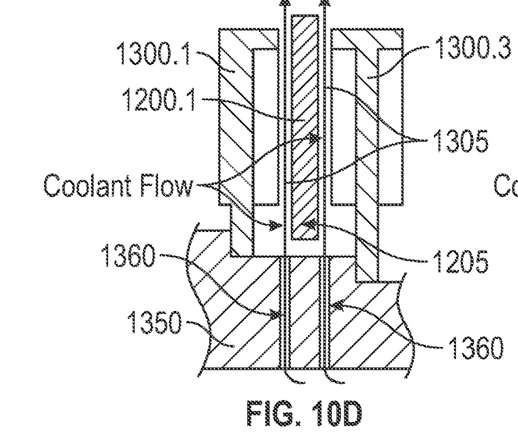
Figure 10E:
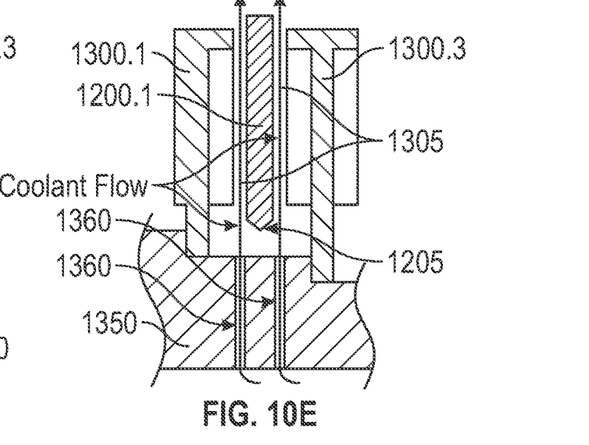

FIGS. 10D and 10E shows yet other embodiments where the radial channels 1360 in shaft 1350 are substantially aligned with air gaps 1305. In the embodiment shown in FIG. 10D, the PCB stator inner edge 1205 can have a flat edge substantially perpendicular to the faces of the PCB stator 1200.1. In the embodiment shown in FIG. 10E, the PCB stator inner edge 1205 has a substantially wedge shape that can help direct the coolant flow towards the air gaps 1305.

Figure 10F:
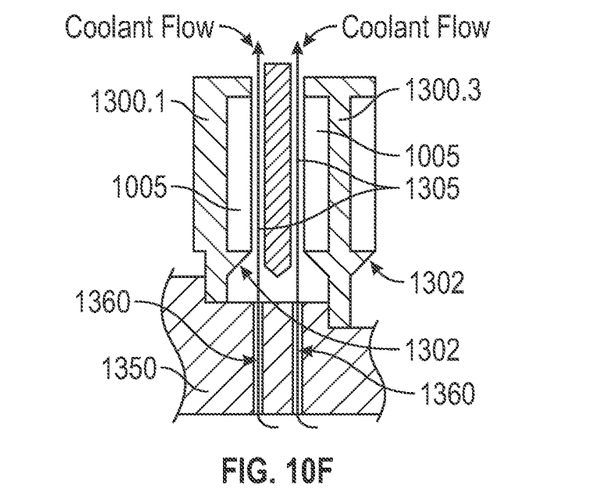

In some embodiments of the axial field rotary device 1000, the rotor disks 1300 can have a profile that helps direct the coolant flow. FIG. 10F shows an example of such embodiment were the rotor disks 1300.1 and 1300.3 have a tapered profile 1302 inbound of magnets 1005. In this embodiment, the tapered profile 1302 helps to direct the coolant dispensed through the radial channels 1360 towards the air gaps 1305 and protect the inner edges of magnets 1005 from direct exposure to the coolant flow.

In some embodiments of the of the axial field PM rotary device 1000, the radial channels 1360 of the shaft 1350 can have different cross sections to adjust the coolant flow going into the volumes delimited by adjacent rotor disks. In other embodiments, the channels 1360 of the shaft 1350 can have nozzles similar to the nozzles 365 shown in FIGS. 6, 7 and 8 to adjust the coolant flow going into the said volumes.

The coolant that flows through the axial field PM rotary device 1000 can be, for example, a mineral oil based coolant, or a water based coolant. In embodiments that employ water based coolants, the PCB stators can have a cladding similar to the cladding 260 shown in FIG. 8 to prevent direct contact between the PCB stator and the coolant. In those embodiments, the bearings 1380, shown in FIG. 9, can be sealed and the channels 1370 can be absent.

Figure 11:
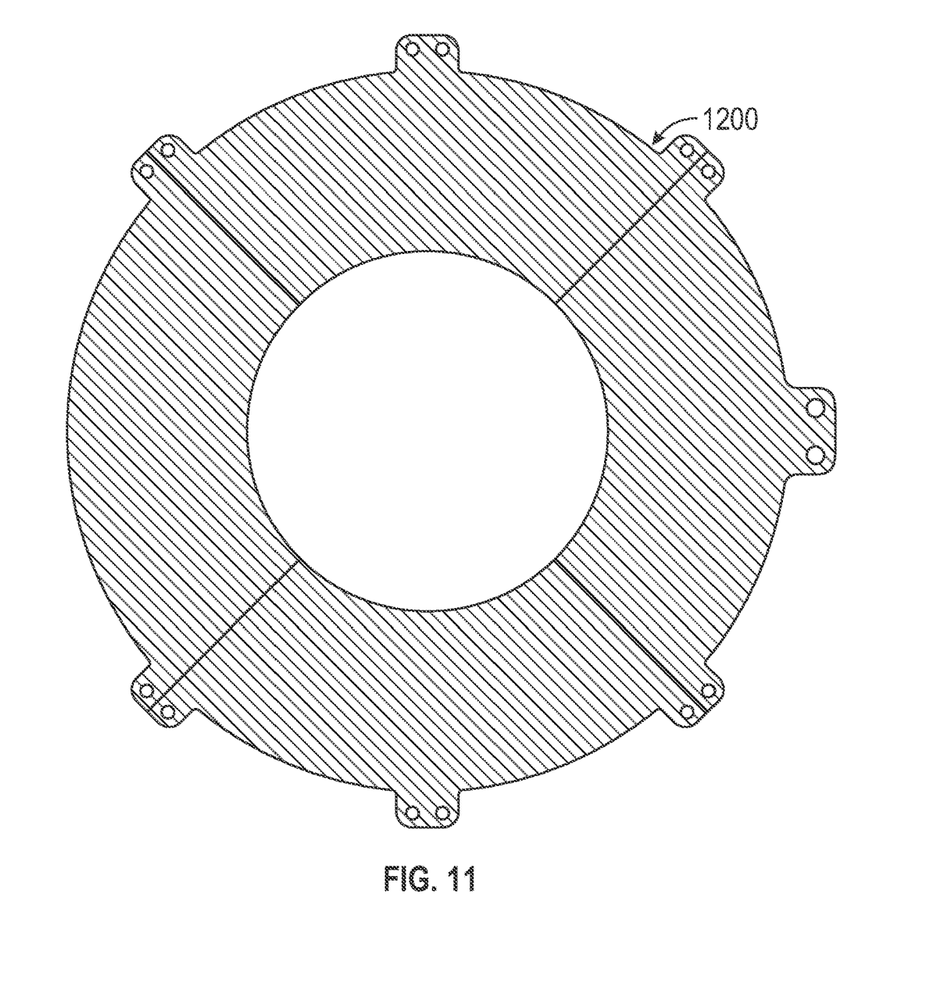
FIG. 11 is a plan view of an embodiment of a segmented stator for the device.

The PCB stators 1200.1 to 1200.3 depicted in FIGS. 9 and 10A can be made of a single laminated stack of prepreg and copper foil layers, however in some applications the PCB stator can be segmented as the stator 1200 depicted in FIG. 11, which has 4 segments that can be mechanically and electrically coupled together. Other embodiments of stator 1200 can have a different number of segments.

Figure 12A:
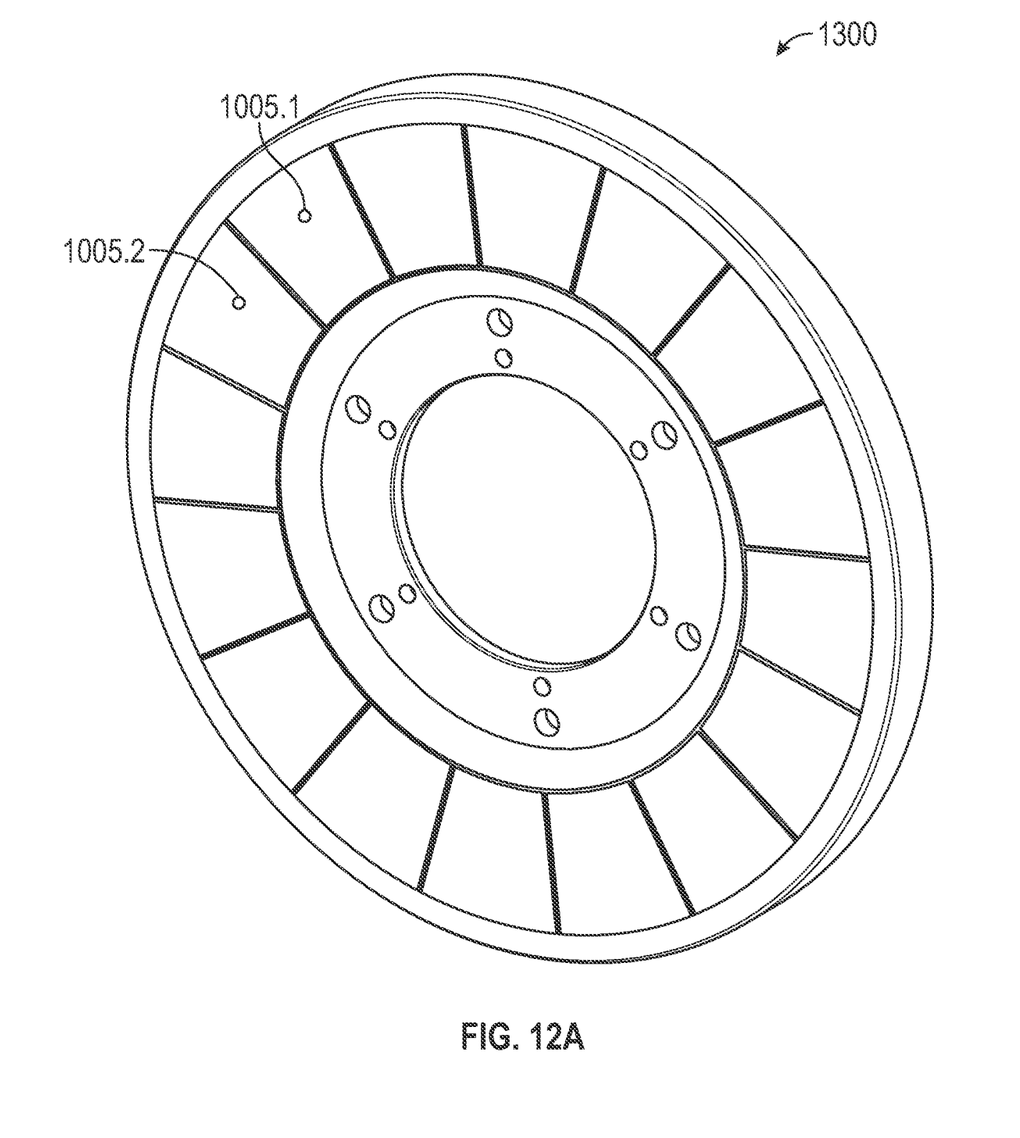
FIG. 12A is an isometric view of an embodiment of a rotor.

FIG. 12A shows an embodiment of an individual rotor disk 1300 of device 1000. In this embodiment, the rotor disk can carry a plurality of alternating polarity magnets 1005.1 and 1005.2 where magnets 1005.1 can be oriented as north poles and magnets 1005.2 can be oriented as south poles, for example. Although the embodiment shown in FIG. 12A has a 16-pole magnet arrangement, other embodiments can have different number of magnets.

Figure 12B:
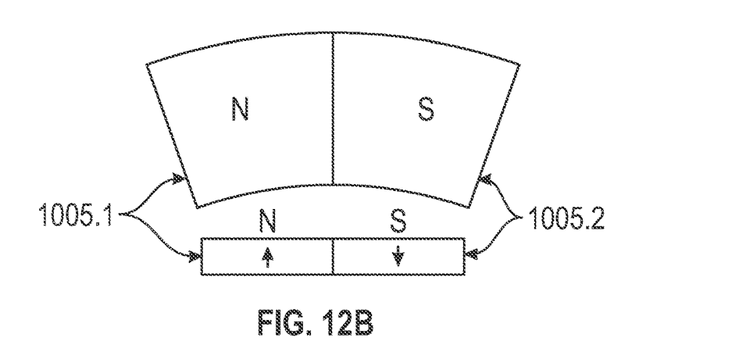
FIGS. 12B-12D are partial plan views of embodiments of magnets.
Figure 12C:
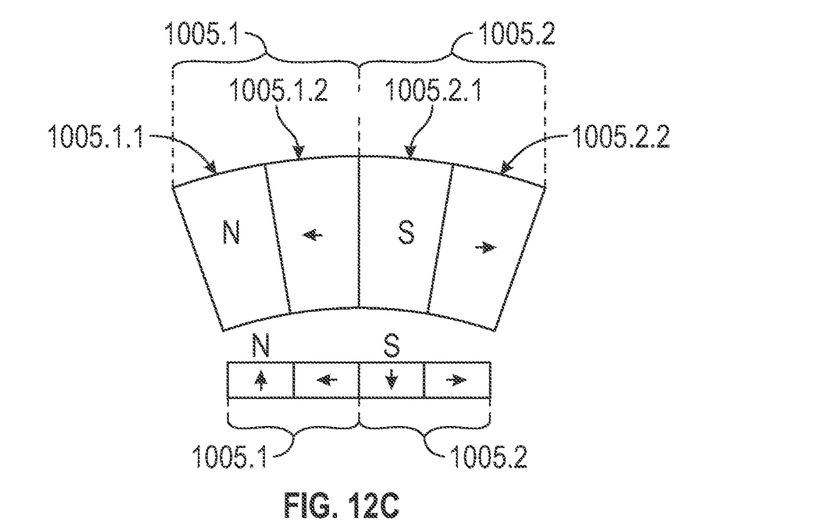
Figure 12D:
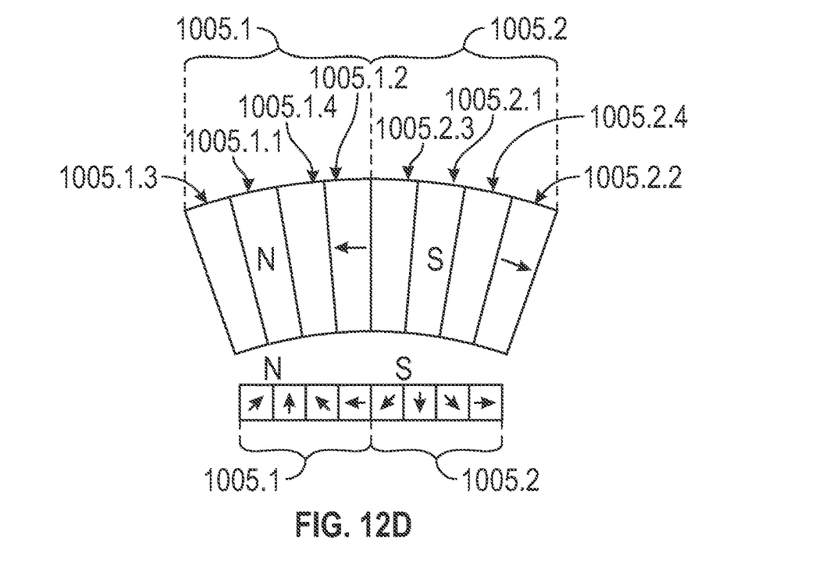

FIGS. 12B-12D show details of different embodiments of magnet arrangements of rotor disk 1300. FIG. 12B shows the orientation of magnets 1005.1 and 1005.2 depicted in FIG. 12A where magnet 1005.1 is oriented as a north pole and magnet 1005.2 is oriented as a south pole. This magnet pattern orientation is repeated around the whole rotor disk 1300.

In other embodiments of rotor disk 1300, the magnets can be arranged in a Halbach array with two magnets per pole. FIG. 12C shows an example of such magnet arrangement. In this embodiment magnet 1005.1 is split into two segments: 1005.1.1 and 1005.1.2 with substantially the same angular span. Segment 1005.1.1 is oriented as a north pole and segment 1005.1.2 is oriented in a direction perpendicular to magnet 1005.1.1 orientation with its north pole pointing to magnet 1005.1.1. Similarly, magnet 1005.2 is split in two segments: 1005.2.1 and 1005.2.2 with substantially the same angular span. Segment 1005.2.1 is oriented as a south pole and segment 1005.2.2 is oriented in a direction perpendicular to magnet 1005.2.1 orientation with its north pole pointing away from magnet 1005.2.1. This magnet pattern orientation is repeated around the whole rotor disk 1300.

FIG. 12D shows another embodiment of magnets forming a Halbach array on rotor disk 1300. In this embodiment magnet 1005.1 is split into four segments: 1005.1.1 to 1005.1.4 with substantially the same angular span. Segment 1005.1.1 is oriented as a north pole and segment 1005.1.2 is oriented in a direction perpendicular to magnet 1005.1.1 orientation with its north pole pointing to magnet 1005.1.1. Segments 1005.1.3 and 1005.1.4 are interspersed between segments 1005.1.1. and 1005.1.2 and oriented at approximately 45 degrees from the orientation of magnet 1005.1.1 with their north poles pointing to magnet 1005.1.1. Similarly, magnet 1005.2 is split in four segments: 1005.2.1 to 1005.2.4 with substantially the same angular span. Segment 1005.2.1 is oriented as a south pole and segment 1005.2.2 is oriented in a direction perpendicular to magnet 1005.2.1 orientation with its north pole pointing away from magnet 1005.2.1. Segments 1005.2.3 and 1005.2.4 are interspersed between segments 1005.2.1. and 1005.2.2 and oriented at approximately 45 degrees from the orientation of magnet 1005.2.1 with their north poles pointing away from magnet 1005.2.1. This magnet pattern orientation is repeated around the whole rotor disk 1300.

The magnet configuration depicted in FIG. 12A and detailed in FIG. 12B can include a rotor disk 1300 made of a soft magnetic material such as a low carbon steel alloy, such as A36, or SAE 4140, for example, as the rotor disk carries the magnetic flux produced by the magnets. The Halbach array magnet configurations depicted in FIGS. 12C and 12D may include a rotor disk 1300 made of non-magnetic material as the magnetic flux is channeled through the magnets themselves. Thus, other materials can be used for the rotor disks 1300 based on their strength to weight ratio or other properties. Some embodiments can have rotor disks made of carbon fiber composite. Other embodiments can have rotor disks made of aluminum alloy, such as Aluminum 6061-T6, or titanium alloys such as Titanium Grade 9 3AL-2.5V, for example.

Figure 13:
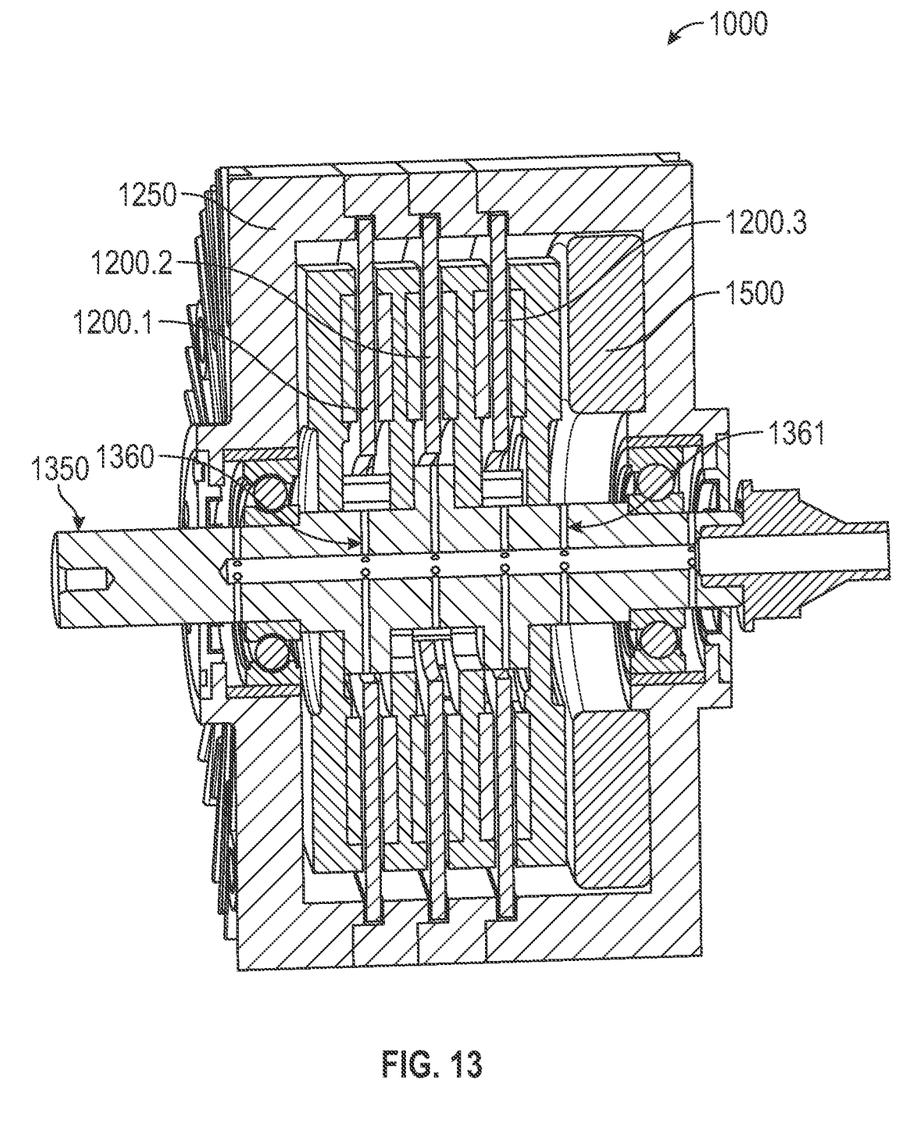
FIG. 13 is a sectional side view of yet another embodiment of the device.

Some embodiments of the axial field PM rotary device 1000 can have inductors connected in series with the PCB stators 1200.1-1200.3. FIG. 13 shows one example of an embodiment of the axial field PM rotary device 1000 where an inductor 1500 is coaxially mounted inside the housing 1250, so the inductor can also be cooled by the coolant dispersed inside the housing 1250 through the radial channels 1360 of the shaft 1350. In other embodiments, the shaft 1350 can have an additional set of radial channels 1361 assigned to provide a coolant flow to cool the inductor 1500.

The terminology used herein is for the purpose of describing particular examples and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms/such as "inner/" "outer/" "beneath," "below" "lower/" "above/" "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described herein can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disk (CD), a digital video disk (DVD), solid state drive (SSD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disk or an erasable memory device.

Also, the use of "a" or "an" is employed to describe elements and components described herein. This is done merely for convenience and to give a general sense of the scope of the invention. This description should be read to include one or at least one and the singular also includes the plural unless it states otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features which are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

We claim:

1. An axial field rotary energy device, comprising:
    a housing;
    rotor disks having an axis of rotation and rotatably coupled to the housing, and each rotor disk comprises a magnet on at least one side of the rotor disk;
    printed circuit board (PCB) stators located axially between the rotor disks and coupled to the housing, each PCB stator comprises layers, and each layer comprises coils, wherein a number of the rotor disks is equal to a number of stators plus one, and the stators are interleaved with the rotor disks;
    a shaft coupled to the rotor disks and the housing, the shaft has a hollow section configured to be coupled to a source of a liquid coolant through a rotary connector and to radial channels in the shaft that are configured to dispense a liquid coolant between the rotor disks and PCB stators; and
    the shaft has flanges with different diameters configured to receive the rotor disks with respective matching bore diameters.

2. The device of claim 1, wherein the radial channels that dispense the liquid coolant are substantially aligned with respective ones of the PCB stators.

3. The device of claim 1, wherein the radial channels that dispense the liquid coolant are substantially aligned with air gaps between the PCB stators and the rotor disks.

4. The device of claim 1, further comprising shims between flanges of the shaft and the rotor disks to adjust air gaps between the rotor disks and the PCB stators.

5. The device of claim 1, wherein the rotary connector coupled to the shaft is configured to operate at 7,500 rpm or more.

6. The device of claim 1, wherein the rotor disks have tapered surfaces inboard of the magnets.

7. The device of claim 1, wherein inner diameter edges of the PCB stators are tapered to form a wedge profile.

8. The device of claim 1, wherein the rotor disks comprise a soft magnetic material.

9. The device of claim 1 where the rotor disks comprise a non-magnetic material.

10. The device of claim 9, wherein the rotor disks comprise carbon fiber composite.

11. The device of claim 9, wherein the magnets on the rotor disks are arranged in a Halbach array configuration with two magnets per pole with a first magnet oriented perpendicular to a plane of a respective rotor disk and a second magnet oriented perpendicular to the first magnet.

12. The device of claim 9, wherein the magnets on the rotor disks are arranged in a Halbach array configuration with four magnets per pole with a first magnet oriented perpendicular to a plane of a respective rotor disk and a second magnet oriented perpendicular to the first magnet and interspersed with a third magnet and a fourth magnet oriented at 45 degrees relative to the first magnet.

13. The device of claim 1, further comprising inductors inside the housing that are connected in series with the PCB stators.

14. The device of claim 13, wherein the shaft has radial channels to dispense liquid coolant to cool the inductors.

15. The device of claim 1, wherein the housing comprises a sump that is configured to collect the liquid coolant.

16. An axial field rotary energy device, comprising:
    a housing;
    rotor disks having an axis of rotation and rotatably coupled to the housing, each rotor disk comprises magnets on at least one side of the rotor disk, and the magnets on the rotor disks are arranged in a Halbach array configuration with a plurality of magnets per pole;
    printed circuit board (PCB) stators located axially between the rotor disks and coupled to the housing, each PCB stator comprises layers, and each layer comprises coils, wherein a number of the rotor disks is equal to a number of stators plus one, and the stators are interleaved with the rotor disks;
    a shaft coupled to the rotor disks and the housing, the shaft has a hollow section configured to be coupled to a source of a liquid coolant through a rotary connector and to radial channels in the shaft that are configured to dispense a liquid coolant between the rotor disks and PCB stators; and
    the shaft has flanges with different diameters configured to receive the rotor disks with respective matching bore diameters.

17. The device of claim 16, wherein the rotor disks comprise a non-magnetic material.

18. The device of claim 16, wherein each rotor disk comprises two magnets per pole with a first magnet oriented perpendicular to a plane of a respective rotor disk and a second magnet oriented perpendicular to the first magnet.

19. The device of claim 16, wherein each rotor disk comprises four magnets per pole with a first magnet oriented perpendicular to a plane of a respective rotor disk and a second magnet oriented perpendicular to the first magnet and interspersed with a third magnet and a fourth magnet oriented at 45 degrees relative to the first magnet.

20. The device of claim 16, further comprising inductors inside the housing that are connected in series with the PCB stators, and the shaft has radial channels to dispense liquid coolant to cool the inductors.

* * * * *